April 13, 1937. W. I. JONES 2,077,368
SNAP FASTENER MEMBER
Original Filed May 9, 1933
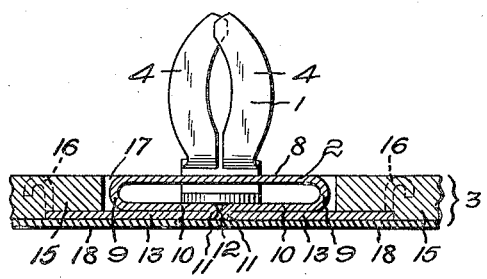
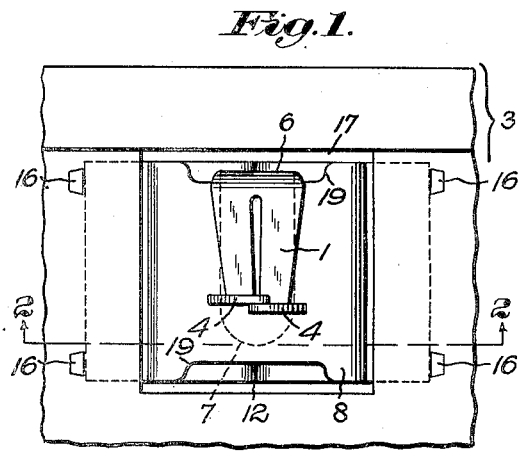
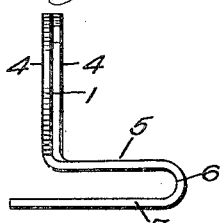
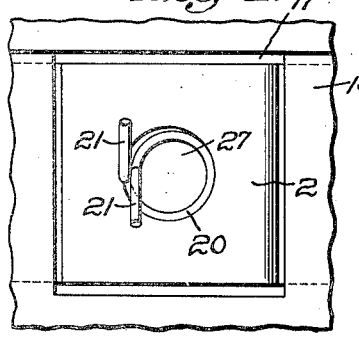
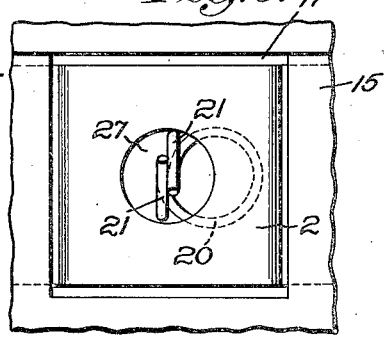
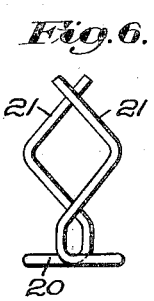
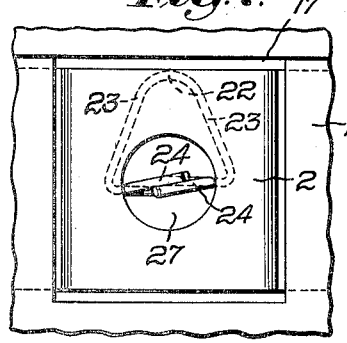
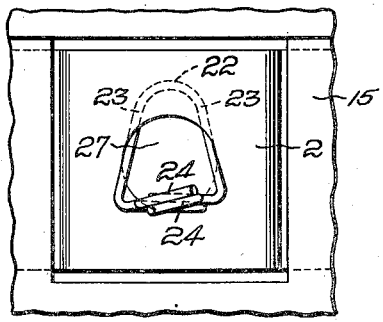
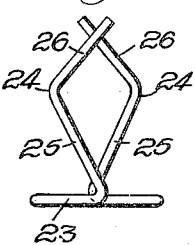
Inventor:
Walter I. Jones Patented Apr. 13, 1937

2,077,368

UNITED STATES PATENT OFFICE 2,077,368

SNAP FASTENER MEMBER

Walter I. Jones, Arlington, Mass., assignor to United-Carr Fastener Corporation, Cambridge, Mass., a corporation of Massachusetts Original application May 9, 1933, Serial No. 670,135. Divided and this application January 10, 1934, Serial No. 706,096

2 Claims. (Cl. 24—213)

My invention aims to provide improvements in separable snap fastener members and attaching devices for the same.

This application is a divisional of my co-pending application Serial No. 670,135, filed May 9, 1933.

In the drawing, which illustrates preferred embodiments of my invention:

Figure 1 is a plan view of a stud member shown assembled in its operative position with my improved fastener installation;

Fig. 2 is a sectional view on the line 2—2 of Fig. 1;

Fig. 3 is a side elevation of the hook-on stud member shown in Figs. 1 and 2;

Fig. 4 is a plan view of another form of installation illustrating the method of assembling the stud member with a covering structure by contraction of the circumference of the base and insertion through an aperture of an attaching member attached to the covering structure;

Fig. 5 is a plan view showing my improved fastener member, illustrated in Fig. 4, in its operative position;

Fig. 6 is an end elevation of the stud member shown in Figs. 4 and 5;

Fig. 7 is a plan view of another embodiment of my improved stud member shown in its operative position with an installation like that shown in Figs. 4 and 5;

Fig. 8 is a plan view illustrating the method of assembling with a covering structure the stud member shown in Fig. 7; and Fig. 9 is a front elevation of the stud member shown in Figs. 7 and 8.

Referring to the embodiment of my invention as illustrated by Figs. 1 through 9, I have shown a shiftable stud fastening device adapted to be detachably secured within an attaching member secured to a covering structure comprising a relatively stiff backing material and a covering material.

My invention includes the attaching member secured to a covering structure, as well as the stud members illustrated in Figs. 3, 6 and 9 and the method of inserting the stud members into engagement with the attaching members.

The attaching means for each installation shown is similar and may be made from a single strip of relatively thin metal bent into a loop providing a meeting edge at one face and having portions extending away from the meeting edge and beyond the limits of said loop while being provided with attaching prongs at the ends thereof so that the attaching member may be secured to a suitable covering structure.

In Fig. 1, I have shown a well-known type of stud fastener member 1 positioned and held by my improved attaching member 2 which is secured to a covering structure 3. The stud member shown in Figs. 1, 2 and 3 is formed from a piece of sheet metal stock and is provided with movable arms 4, 4 adapted to engage a cooperating socket, a top base portion 5, a return bend 6 and a lower base 7. The stud member 1 as described and illustrated is well-known to the art and is used merely for illustrative purposes, no claim to it being made. The attaching member is best illustrated in Figs. 1 and 2, and may be formed from a single sheet of relatively thin metal bent into a loop providing a top face 8, return bend portions 9, 9 and a bottom face 10, the ends of the loop 11, 11 forming meeting edges 12. The remaining portions 13, 13 are bent back along the face providing the meeting edges, forming a double thickness of the metal thereby strengthening it. The portions 13, 13 are adapted to fit flush with the backing material 15 and are held in position by attaching prongs 16, 16 for the purpose of rigidly securing the attaching member to the backing material. The attaching prongs 16, 16 extend from the end of the attaching member into and through the backing material 15 and thereafter deflect back into the backing material, thus providing a firm hooklike means for securing the attaching member to the backing material. The backing material may consist of cardboard or some other type of relatively stiff material adapted to be penetrated by the prongs 16. The attaching member is adapted to fit within an aperture 17 in the backing material and is arranged so that the face having the meeting edges 12 is flush with the outer surface of the backing material. A covering material 18 overlies the attaching member and the backing material at the side of the attaching member, presenting a flush surface which may comprise upholstery or some other form of flexible material used for a like purpose. If it is desired to use the hook-on stud fastener member 1 with my attaching member, notches 19, 19 (Fig. 1) are provided to permit the insertion of the base 7 beneath the face 8 as well as allowing room for lateral shifting of the stud member, viz., the length of the notch 19, whereby it may be brought into alignment to engage or cooperate with a fastener socket provided on a frame structure not shown.

My improved stud member, shown in Fig. 6, may be formed from a piece of spring wire bent into a form providing a circular base 20 and a pair of movable arms 21, 21 extending upwardly and integral with the periphery of the base. The arms 21, 21 are perpendicular to the periphery 20 and are bent to form a head and neck portion. The neck portion comprises diverging elements and the head portion converging elements.

The movable arms shown in the type of stud members illustrated herein are arranged in juxtaposition and move toward and away from each other, in a scissors-like movement during engagement or disengagement with a cooperating socket (not shown). Heretofore similar wire stud members were provided with movable arms extending upwardly from the center of a base, but by my construction I have simplified the manufacture as well as cheapened the cost of a unit by saving the extra wire that was formerly used to connect the arms to the periphery of the base. In my improved stud member, the arms extend upwardly from the periphery of the base and combine the flexibility of the base with the movability of the arms, forming a stud member having a strong, durable and positive connecting engagement means. Further features of this new type of construction will be described and pointed out hereafter.

A new and novel feature of my invention is the method of inserting the stud member shown in Fig. 6, which has a base of greater width than the aperture 27 in the supporting structure or attaching member 2. The method is to manipulate the stud member so as to decrease the width of the base whereby it may readily pass through the aperture and, after so doing, the manipulating means may be released and the base of the fastener member, assuming its normal size, is securely held therein.

In Figs. 4 and 5, I have illustrated a method of inserting the stud member shown in Fig. 6 into an aperture 27 of my attaching member 2. The movable arms are pushed or forced toward each other at the periphery of the base and, when so acted upon, they tend to coil up the circular base which thereby sufficiently decreases its width permitting it to be inserted through the aperture 27 by axial movement. Thereafter the pressure on the movable arms is released and the base uncoils, thereby assuming its normal width and preventing the stud member from becoming disengaged from the attaching member while permitting lateral shifting. Fig. 4 shows the stud member with its base contracted and partially inserted into the aperture 27, and Fig. 5 shows the stud member in its operative position, its base having assumed its normal width, which prevents the stud member becoming disengaged from the attaching member.

In Fig. 9, I have shown a modification of my improved stud member comprising a form having a triangular base provided with an apex 22 and sides 23, 23 extending from the apex. A pair of movable arms 24 extend upwardly from and integral with the periphery of the base and from the side opposite the apex 23 to provide the diverging portions 25 and converging portions 26 forming the neck and head portions, respectively, of the stud member.

In Figs. 7 and 8, I have shown the method of assembly with an upholstery installation, the preferred embodiment of my improved stud member as shown in Fig. 9 having an end of greater width than a given aperture 27. The apex of the triangular base is inserted into the aperture 27 of the attaching member, thereafter a force is exerted upon the movable arms in the direction of the apex 22 whereby the sides of the base 23, 23 when in contact with the sides of the aperture, are forced toward each other. In this manner, the width of the base is decreased, thereby permitting the entire base to pass through the aperture 27.

Fig. 8 shows the stud member partially inserted into the aperture 27 and shows the points of contact of the base with the inner wall of the aperture 27. The base is partially contracted at the side of the movable arms. Fig. 7 shows the stud member with its base completely beneath the attaching member and in its operative position, the base having assumed its normal size to prevent the stud member becoming accidentally detached from the attaching member. The contraction and expansion of the base of the stud member to permit insertion through an aperture is permitted by the fact that the movable arms are arranged in juxtaposition at the periphery of the base and may slide back and forth in relation to each other. In so doing, the size of the base is decreased and increased as and for the purpose described.

While I have described, in connection with the stud members shown in Figs. 6 and 9, the preferred method of inserting their bases through an aperture in a supporting structure, I wish to point out the fact that either member may be inserted through the aperture in the manner described for the other.

A further feature of my invention is the fact that, inasmuch as there is a space from the base of the movable arms to the inner wall of the aperture, there is allowed room for the stud member to shift laterally in all directions, whereby it may automatically be brought into alignment to cooperate with a fastener socket.

An additional feature of my invention permits the stud members shown in Figs. 6 and 9 to be detachably secured to the attaching member, the method of attachment being generally to contact the base so that it is of smaller diameter than the aperture and thereafter allowing it to spring outwardly, whereby it is of larger diameter than the aperture and, if it is desired to be removed, the base may be contracted and removed through the aperture.

The attaching member described in the specification provides a firm support, is easily and cheaply manufactured and is adapted to present a flush surface with the backing material so that a layer of upholstery material will lie flat at the flush surface side, thereby presenting a neat appearance and preventing uneven wear on the upholstery layer.

The fastener illustrated and described herein is strong, durable, positive in action, cheap to manufacture and the contour permits an easy adjustment with an attaching member secured to upholstery or trim panelling and, because of the fact that the sides of the base of the stud members may be contracted and expanded, thereby permits the bases of the members to be inserted through a minimum sized aperture in a simple, easy manner and, when so inserted, are firmly held therein.

It should be understood that my invention is not limited to the particular arrangement of the fastener members and of the attaching member, or the combination of such with upholstery panels as illustrated and described herein, because the scope of my invention is best defined as set forth in the following claims.

I claim:—

1. In combination with a snap fastener member, an attaching member of the class described comprising a piece of material bent into a loop having two opposite faces parallel, the portions forming the closure of said loop being in abutting relationship, the ends of said loop being bent in opposite directions from said closure along one of said parallel sides thereby providing a double thickness at one face of said attaching member, said ends extending beyond the limits of said loop and having attaching prongs at the ends thereof, and said attaching member having means for holding said snap fastener member.

2. In combination with a snap fastener member, an attaching member for said fastener member, said attaching member comprising a piece of material bent into a substantially closed loop having two opposite faces parallel, the ends of said loop being bent in opposite directions along one of said parallel sides thereby providing a double thickness of material at one face of said attaching member, said ends extending beyond the limits of said loop and having attaching prongs at the ends thereof, said attaching member having a notch at one edge of a face for cooperating with said snap fastener member.

WALTER I. JONES.